Figure 4:
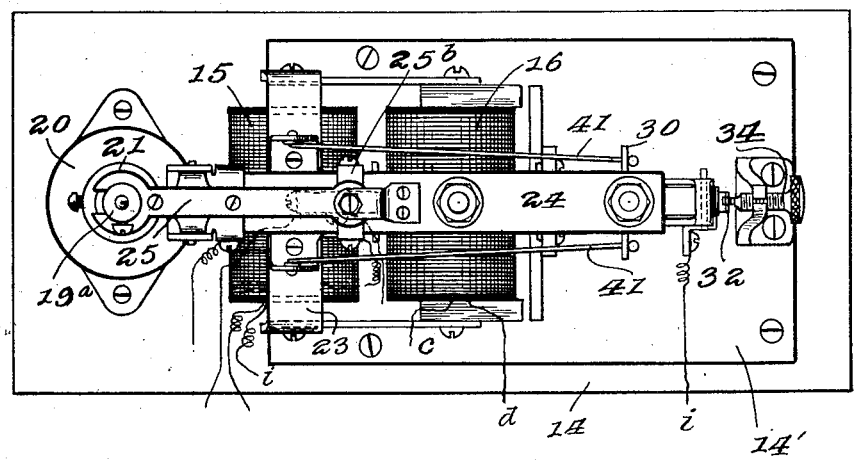

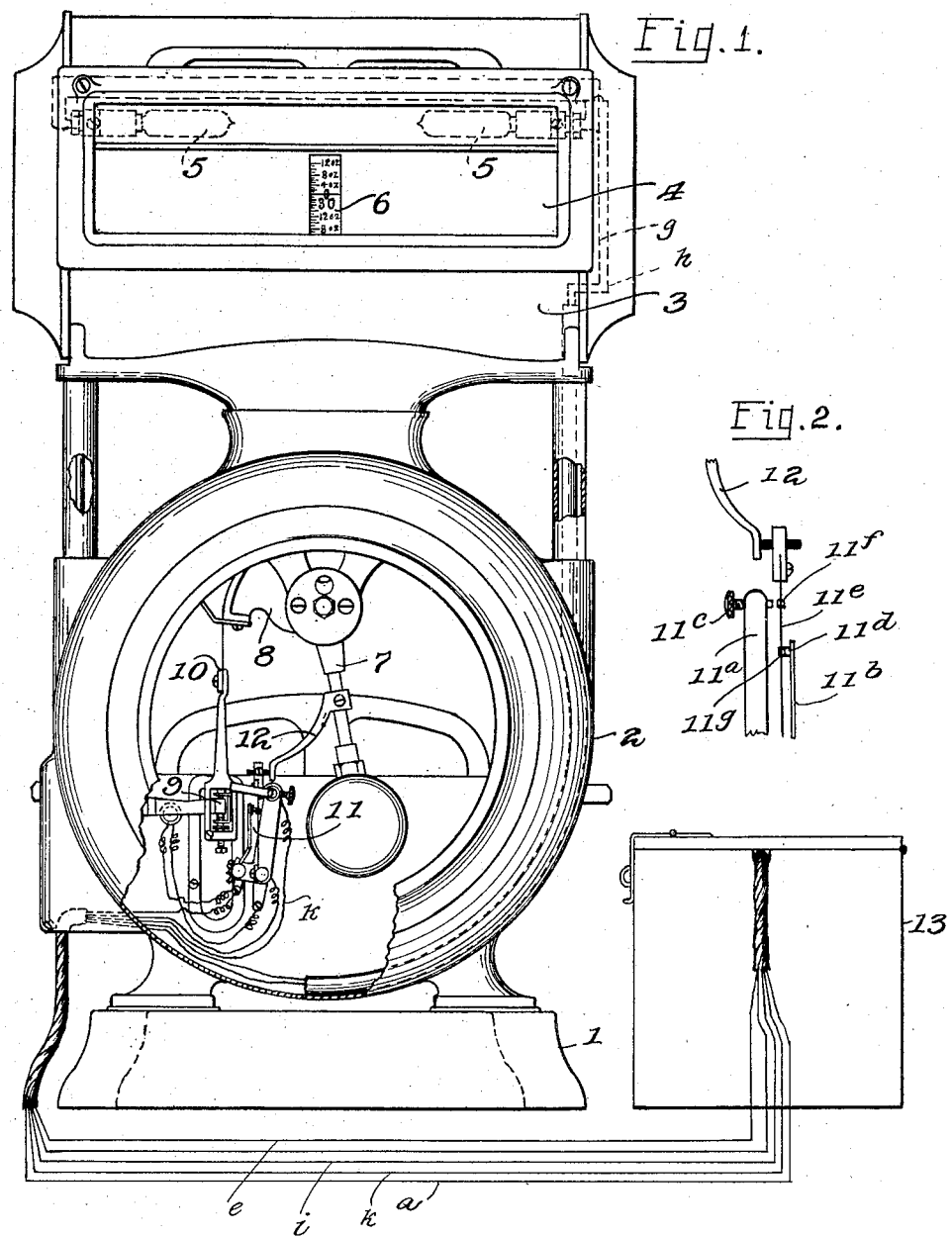

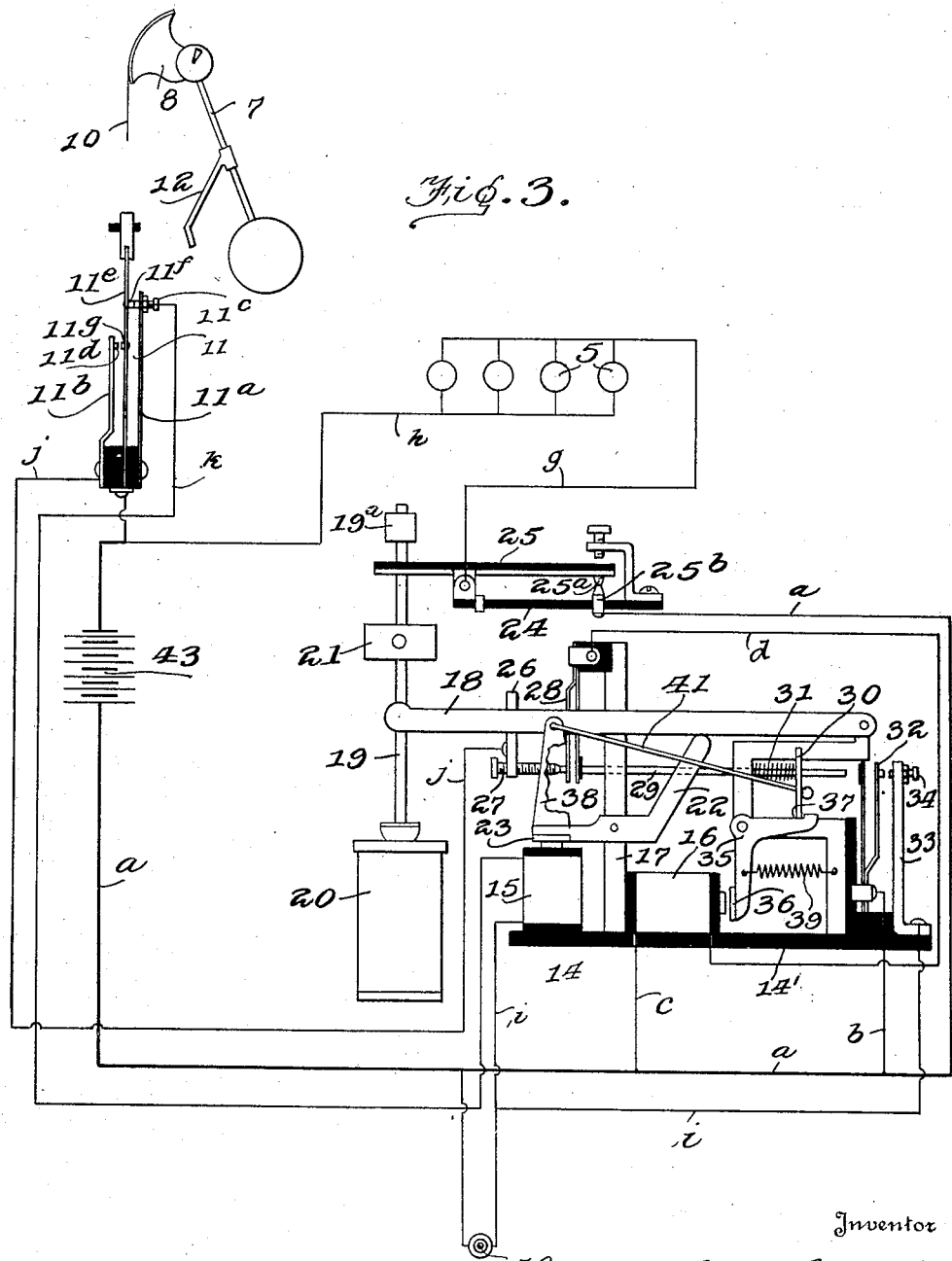

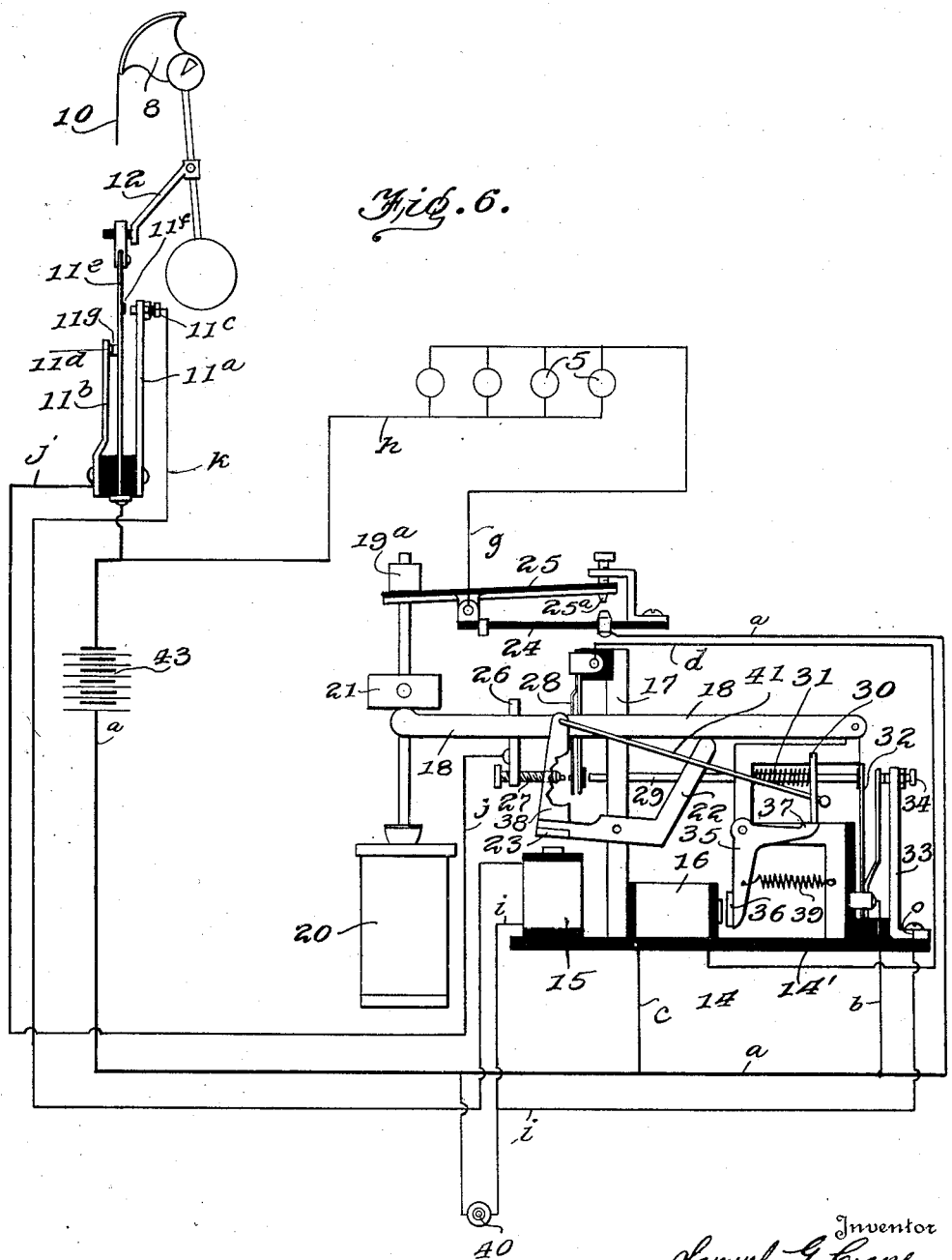

Patented June 19, 1923.

1,459,441

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF NEW JERSEY.

ILLUMINATING WEIGHING SCALE.

Application filed March 29, 1918. Serial No. 225,387.

*To all whom it may concern:*

Be it known that I, SAMUEL G. CRANE, a citizen of the United States, residing at Toledo, in the county of Lucas and State of Ohio, have invented certain new and useful Improvements in Illuminating Weighing Scales, of which the following is a specification.

This invention relates to automatically reset switch mechanism for weighing scales and the like and more particularly to self-illuminating weighing scales wherein the chart and adjacent portions are illuminated when a commodity is placed on the platform of the scale. My invention is applicable to many different types of scales and is particularly adapted and shown applied to scales wherein the load-offsetting mechanism includes a moving pendulum.

Illuminating scales now on the market are so constructed that the chart is illuminated when a commodity is placed upon the platform thereof and is not extinguished until removal of said commodity. It is obvious that should a butcher's tool or similar article be left on the platform of the scale due to inadvertence, carelessness or neglect on the part of the user, the scale will continue to be illuminated, which will rapidly consume the source of electrical supply, which in many cases comprises a storage or dry cell battery.

The primary object of my invention is to improve scales of this type by providing a timing mechanism which, while causing the scale to be illuminated upon the placing of a commodity upon the platform, will automatically extinguish the lamps after a certain predetermined period of illumination. Furthermore, I provide a novel device which will, after extinguishing the lamps, automatically re-adjust itself for the next weighing operation.

For the convenience of certain classes of weighing, as, for example, the weighing of granular commodities, such as sugar and the like, where it is necessary to slowly add or subtract portions of the commodity until the correct weight is obtained, which operations consume a greater period of time than the initial period of illumination, I provide a manually-operated means, such as a push button, to electrically actuate the timing mechanism so that the scale may be illuminated for a longer period of time.

With these and other objects in view which will more readily appear as the invention is better understood, my invention consists of the novel construction, combination and arrangement of parts hereinafter more fully described and particularly pointed out in the subjoined claims.

Referring to the drawings, which are merely illustrative of my invention:—

Figure 5:
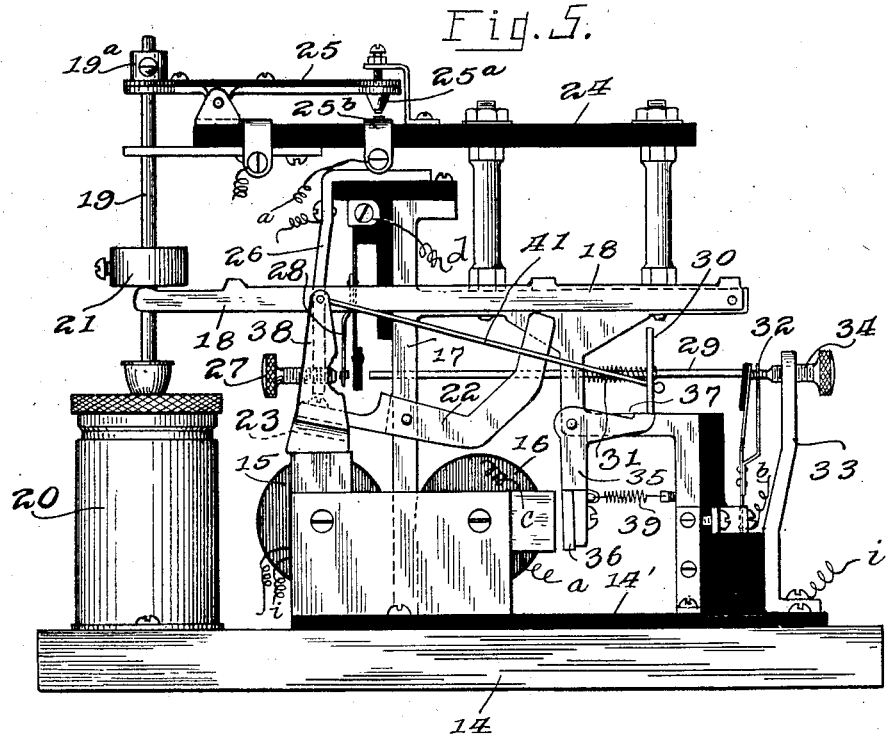

Figure 1 is a rear elevation of a weighing scale, with parts broken away to show the interior mechanism thereof; Figure 2 is a fragmental detail view of the automatic illuminating switch; Figure 3 is a diagrammatic view of the timing mechanism electrically connected to the illuminating switch, illustrating the positions assumed by the various parts and the path of the current when a commodity is placed on the platform of the scale; Figure 4 is a top plan view of the timing mechanism; Figure 5 is a side elevation thereof; and Figure 6 is a diagrammatic view similar to Figure 3 illustrating the positions assumed by the various parts and the path of the current when the scale is at rest.

Referring further to the drawings, the numeral 1 designates the base having mounted thereon a housing 2 supporting a cylindrical drum 3 provided with windows 4 and a plurality of lamps 5, said lamps being herein shown as arranged within the drum 3 to effectively illuminate a computing cylinder 6 rotatably mounted within said drum. Pivotally mounted within the housing 2 is the load-offsetting mechanism of the scale which comprises a pendulum 7 formed with a cam segment 8 at its upper end and operatively connected by means of the flexible connection 10 to one end of the platform lever 9 fulcrumed upon the base 1 in the usual manner and carrying a commodity-receiving platform.

In carrying out the purpose of my invention, which is to provide a scale adapted to be illuminated only for a predetermined time during the weighing operation, I have provided a flexible switch 11 actuated by an arm 12 secured to said pendulum which is adapted to hold the switch open when the scale is at rest and to move out of contact therewith to permit the switch to close when a commodity is placed upon the platform. The switch 11 is of the usual two way type, and consists of spaced brackets 11ª and 11ᵇ provided with an adjustable contact 11ᶜ and a permanent contact 11ᵈ respectively. Interposed between these brackets is a flexible member 11ᵉ having contacts 11ᶠ and 11ᵍ formed of platinum or the like adapted to co-operate with the contacts 11ᶜ and 11ᵈ respectively, said flexible member 11ᵉ being provided with a weight at its upper end carrying insulated bumpers which are adapted to contact with the arm 12 of the pendulum.

The timing mechanism may be mounted within the scale housing or may be located within a battery box 13 separate from the scale. In the illustrated embodiment I have shown a timing device in the latter arrangement merely for purposes of illustration, and have shown it as consisting of a base 14 formed with insulating material 14' on its upper face and having mounted thereon magnets 15 and 16, the magnet 15 being electrically connected to the contact 11ᶜ, while the magnet 16 is electrically connected with a switch 32 hereinafter described. Mounted upon the base 14 is a standard 17 upon which is pivoted one end of a trip member 18 (see Fig. 5), the free end of which is bifurcated and straddles a plunger rod 19 operating in an oil dash pot 20 and which carries an adjustable weighted collar 21. A trigger 22 is pivoted upon the standard 17 and has one end thereof formed with an armature 23 adapted to cooperate with the magnet 15, while the other end is upturned and engages the trip member 18. Mounted above the standard 17 is an insulated support 24 upon which is pivoted a lever switch 25 having a contact point 25ᵃ formed on one end thereof and adapted to co-operate with a contact 25ᵇ carried by the support 24 and electrically connected with the lamps 5 through wire a and connected elements. The shorter arm of the lever switch 25 is bifurcated at its end and straddles the plunger rod 19 which carries a collar 19ᵃ at its upper end adapted to engage the lever switch 25 to normally hold the switch open and to extinguish the lamps after the closing of the switch has allowed them to light. The lever 25 is electrically connected with the source of electrical supply 43.

Supported by and insulated from the standard 17 is a bracket arm 26 which has provided at its lower end an adjustable contact screw 27. A flexible switch 28 is also supported by and insulated from the standard 17 and has formed thereon a leaf spring which normally holds the switch contacts in spaced relation. A rod 29 slidably supported in the standard 17 in horizontal alignment with the contact screw 27 and contacts of the flexible switch 28 carries a plate 30 engaged by a coil spring 31 interposed between one arm of the standard 17 and the plate 30 whereby the rod is normally held away from the contact screw 27. A flexible switch 32 identical in construction with the switch 28 is supported by and insulated from the base 14 and normally has its contact carried by the leaf spring engaging with a set screw 34 adjustably mounted in a bracket arm 33 insulated from the base 14. The bracket arm 26 is electrically connected with the switch contact 11ᵇ by the wire $j$, while the flexible switch 28 is connected with the magnet 16, as shown in Fig. 6, by wires $d$ and $c$. The contact screw 34 is electrically connected with the magnet 15 by wire $i$, while the flexible switch 32 is in circuit with the magnet 16 and the battery 43 through wires $b$, $c$ and $a$. Formed on one end of the trigger 22 adjacent its armature 23 are upwardly-extending projections 38 which have pivoted in their upper ends connecting rods 41 which operatively engage the plate 30. Pivoted to the standard 17 is a trigger 35 substantially in the shape of a bell crank, one arm of which carries an armature 36 co-operating with the magnet 16, while the other arm thereof is notched as at 37 to receive the lower end of the plate 30. The armature end of the trigger 35 is normally held away from the magnet 16 by means of a coil spring 39.

The operation of my device is as follows: When a commodity is placed upon the platform of the scale the pendulum is swung outwardly and upwardly (see Fig. 3), permitting the weighted end of the leaf spring 11ᵉ to cause the contacts 11ᶜ and 11ᶠ to close, which closes the circuit and permits the current of electricity to flow from the battery 43 up through the leaf spring 11ᵉ, contact 11ᶜ and wire $k$ to magnet 15 and then through wire $i$ to the normally closed switch 32, through wires $b$ and $a$ to the battery again. This energizes the magnet 15 which attracts the armature 23 and through the upwardly-extending end of the trigger 22 lifts the trip member 18. The downward movement of the armature end of the trigger 22 exerts a pull upon the plate 30 and forces the rod 29 against the switch 28, forcing a contact with the contact screw 27, thereby opening the switch 32 and closing the switch 28. The opening of switch 32 permits the trigger 22 to fall back as current through magnet 15 is stopped, and by closing switch 28 we prepare the apparatus for resetting, as will be presently described. The upward movement of the trip member 18 lifts the plunger rod 19, which raises the collar 19ᵃ away from the shorter arm of the lever switch 25, thereby permitting the contact 25ᵃ of the switch and contact 25ᵇ carried by the support 24 to be closed, allowing the current to flow from the battery 43 through wire $a$ and the contact 25ᵇ to the lever switch 25, thence through the wire $g$ to the lamps 5 and back to the battery 43 through wire $h$. After the plunger rod has slowly descended in the dash pot 20 and the collar $19^a$ again engages the shorter arm of the lever 25, this arm of the lever is depressed and the longer arm thereof raised, disengaging the contacts $25^a$ and $25^b$, which extinguishes the lamps, as shown in Figure 6.

When the commodity is removed from the platform of the scale the pendulum engages the weighted end of the leaf spring $11^e$ and forces the contact $11^g$ into engagement with the bracket $11^b$, as shown in Figures 2 and 6, thereby permitting the current to flow from the battery 43 through the flexible switch $11^a$, bracket $11^b$, wire $j$ to switch 28, now closed, thence through wires $d$ to magnet 16 and back to the battery through wires $c$ and $a$. When the magnet 16 is energized, the armature 36 is attracted, lowering the notch 37 formed in the upper arm of the trigger 35 and causing the disengagement of the plate 30. This closes the switch 32 and opens the switch 28, whereupon the device is ready for the next weighing operation.

When it is desired to have the lamps illuminated for a longer period of time, such as when weighing granular commodities wherein it is oftentimes necessary to slowly add or subtract portions of the commodity before ascertaining the correct weight, I provide a manually-operated means for electrically actuating the timing mechanism which is adapted to re-energize the magnet 15, causing the trip member 18 to lift the plunger in the dash pot and allow the lights to be illuminated, after the initial period of illumination has expired. The manually-operated meanse may be of any suitable construction but it has been advisable to use a push button 40 for this purpose, which may be located in any portion of the scale housing or base convenient to the user of the scale. The push button 40 is electrically connected to the switch member 11 in such a manner so that when the button is actuated the circuit will be closed, which will energize the magent 15 and cause the timing mechanism to be re-actuated to lift the plunger rod 19, thereby allowing the switch 25 to close so that the lamps 5 may be illuminated for an additional period of time.

It is to be understood that while I have shown an operative structure for timing the period of illumination of the lamps and for extinguishing them after such predetermined time and for automatically resetting itself for the next weighing operation, I do not intend to limit myself to the exact construction shown in the drawings, but mean to claim all combinations and mechanisms or equivalents thereto, as, for instance, the substitution of suitable clock mechanism for the illustrated dash pot construction for timing the switch 25.

Having described my invention, I claim:

1. The combination in a self-illuminating scale of load-offsetting mechanism, illuminating means and timing mechanism connected to said illuminating means for controlling the period of illumination actuated by the movement of the load-offsetting mechanism of the scale.

2. The combination in a self-illuminating scale of load-offsetting mechanism a switch mechanism adapted to be closed by the movement of the load-offsetting mechanism, illuminating means and a timing mechanism controlled by said switch mechanism and connected to said illuminating means to cause the scale to be illuminated for a predetermined period of time.

3. In a self-illuminating scale, the combination with load-offsetting mechanism and illuminating means, of a timing mechanism connected to said illuminating means, of a flexible switch mechanism adapted to be closed by the movement of the load-offsetting mechanism, means controlled by said switch mechanism to electrically actuate said timing mechanism to cause the scale to be illuminated for a predetermined period of time, and means for re-setting the timing mechanism after the period has expired.

4. In a self-illuminating scale, the combination with weighing mechanism and illuminating means, of a switch mechanism adapted to be actuated upon movement of the weighing mechanism of the scale, and means electrically connected with said switch mechanism and said illuminating means for causing the scale to be illuminated only for a certain predetermined period of time.

5. In a self-illuminating scale, the combination with a movable scale element and an illuminating device, of switch mechanism adapted to be actuated upon movement of the movable scale element, and means electrically connected with said switch mechanism and said illuminating device for controlling the period of illumination of the scale, the last said means including a magnetically-actuated timing device.

6. In a self-illuminating scale weighing mechanism, electrical mechanism for illuminating the scale including a switch connected to said electrical mechanism and adapted to be actuated by movement of said weighing mechanism and thereby closed for the illumination of said scale, and timing mechanism connected to said switch for controlling the period during which said switch is closed.

7. In a self-illuminating scale weighing mechanism, electrical mechanism for illuminating the scale including a switch connected to said electrical mechanism and adapted to be actuated by movement of said weighing mechanism and thereby closed for the illumination of said scale, and timing mechanism connected to said switch including a dash pot for controlling the period during which said switch is closed.

8. In a self-illuminating scale weighing mechanism, electrical mechanism for illuminating the scale including a switch connected to said electrical mechanism and adapted to be actuated by movement of said weighing mechanism and thereby closed for the illumination of said scale, timing mechanism connected to said switch for controlling the period during which said switch is closed, and means for automatically resetting the timing mechanism after the period has expired.

9. In a device of the class described, in combination, a scale, electrical mechanism for illuminating the scale including a switch adapted to be closed while the scale is illuminated, timing mechanism for controlling the period during which said switch is closed, including a magnet adapted when energized to effect the closing of the switch, means for automatically de-energizing the magnet including a switch normally closed, and means for resetting the switch after the magnet is de-energized to permit the re-energization thereof.

10. The combination with a scale, of illuminating means, timing mechanism for controlling the period of illuminaton, and means actuated by movement of the scale from zero position to set said timing mechanism in operation and thereby initiate the period of illumination.

11. The combination with a scale, of illuminating means, timing mechanism for controlling the period of illumination, means actuated by movement of the scale from zero position to set said timing mechanism in operation, thereby initiating the period of illumination, and means actuated by the return movement of the scale to zero position for re-setting said timing mechanism.

12. The combination with a self-illuminating scale, of a timing device for controlling the period of illumination, an operating and a re-setting circuit each having a normally open and a normally closed switch therein, means operated by movement of the scale from zero position to close the open switch of the operating circuit and open the closed switch of the resetting circuit, means actuated upon the closing of the operating circuit to initiate operation of the timing device, close the normally open switch of the re-setting circuit, and open the normally closed switch of the operating circuit, and means operative by means of the re-setting circuit to return the parts to their initial positions upon return of the scale to zero position.

13. The combination with a self-illuminating scale, of means for controlling the period of illumination, including a timing device having a normally open circuit, means for closing said circuit when the scale is moved from zero position to set said timing device in operation to illuminate the scale, and means operative after a predetermined period of time to extinguish the illumination.

14. In a device of the class described, in combination a scale, an illuminating device and timing mechanism actuated by movement of the scale and so controlling said illuminating device as to effect illumination of the scale for a predetermined period while the scale is under load.

15. In a device of the class described, in combination a scale, an illuminating device, timing mechanism actuated by movement of the scale and so controlling said illuminating device as to effect illumination of the scale for a predetermined period while the scale is under load, and manually operable means for actuating said timing mechanism to effect illumination for additional periods.

16. In a device of the class described, in combination a scale, means for controlling the period of illumination, including a timer, a normally open circuit, means for closing said circuit when the scale is moved from zero position, and means operative upon the closing of said circuit to set said timer in operation and again open said circuit.

17. In a device of the class described, in combination a scale, means for controlling the period of illumination, including a timer, a normally open circuit, means for closing said circuit when the scale is moved from zero position, means operative upon the closing of said circuit to set said timer in operation and again open said circuit, a re-setting circuit arranged to be closed by the return of said scale to zero position, and means operative upon the closing of said re-setting circuit to re-set the controlling means and re-open the resetting circuit.

SAMUEL G. CRANE.

Witnesses:
F. A. CROWLEY,
H. H. LYBRAND.